United States Patent [19]

Frank

[11] 4,408,857
[45] Oct. 11, 1983

[54] METHOD AND CIRCUIT FOR CONTROLLING AN ELECTROMAGNETIC ACTUATOR IN PHOTOGRAPHIC APPARATUS

[75] Inventor: Lee F. Frank, Rochester, N.Y.
[73] Assignee: Eastman Kodak Company, Rochester, N.Y.
[21] Appl. No.: 360,281
[22] Filed: Mar. 22, 1982
[51] Int. Cl.$^3$ .................... G03B 7/097; G03B 9/02; G03B 9/62
[52] U.S. Cl. ................................ 354/234; 354/23 D; 354/29; 354/271
[58] Field of Search .............. 354/29, 30, 43, 50, 354/51, 60 A, 234, 235, 271, 23 D

[56] References Cited

U.S. PATENT DOCUMENTS

| | | |
|---|---|---|
| 3,092,002 | 6/1963 | Frenk ..................................... 95/58 |
| 3,426,662 | 2/1969 | Sevin ..................................... 95/10 |
| 3,604,330 | 9/1971 | Fahlenberg et al. ................... 95/53 |
| 4,016,574 | 4/1977 | Iwata et al. .......................... 354/29 |
| 4,024,552 | 5/1977 | Kondo .................................. 354/234 |
| 4,333,722 | 6/1982 | Lee ...................................... 354/234 |

Primary Examiner—Michael L. Gellner
Attorney, Agent, or Firm—Thomas H. Close

[57] ABSTRACT

An improved control circuit for an electromagnetic actuator of the type having an armature mounted for movement in a magnetic field, and means connected to the armature for urging the armature toward a rest position. The circuit applies an electrical pulse of a first polarity, magnitude and duration to the armature to quickly move the armature to a programmed position determined by the magnitude and duration of said pulse, the programmed position lying within a range of positions between said rest position, and an extreme position achievable by the armature. The control circuit then applies a pulse of opposite polarity and of magnitude and duration effective to stop the armature at the programmed position. The control circuit applies a periodic train of pulses of said first polarity, of fixed magnitude and of duration, effective to hold the actuator in the programmed position, the period of said train of pulses being above the natural cutoff frequency of the actuator. To quickly return the armature to the rest position, the control circuit applies a pulse of opposite polarity and of duration and magnitude effective to the armature to move the armature in cooperation with the urging means, to the rest position. The circuit then applies a braking pulse of said first polarity and of duration and magnitude effective to stop the armature at the rest position.

In a preferred embodiment, the actuator controls a shutter/aperture in a camera, the duty cycle (i.e. pulse duration) of the train of pulses determines the aperture size, and the number of pulses in the pulse train determines the shutter time. The control circuit also includes means for boosting the voltage of the moving and braking pulses to achieve extremely short shutter times.

23 Claims, 20 Drawing Figures

PRIOR ART

WITH OVERBOOST

METHOD AND CIRCUIT FOR CONTROLLING AN ELECTROMAGNETIC ACTUATOR IN PHOTOGRAPHIC APPARATUS

BACKGROUND OF THE INVENTION

1. Field of the Invention

This invention relates to the control of electromagnetic actuators in photographic apparatus, and more particularly to the control of actuators of the type having an armature mounted for movement in a magnetic field and means connected to the armature for urging the armature toward a rest position, and being particularly adapted for control by a digital computer.

2. Discussion Related to the Problem

The trend in photographic camera design is toward the use of a small digital computer called a microcomputer, to control all camera functions. The microcomputer accepts digital inputs from a variety of transducers in the camera, such as scene light measuring apparatus, camera mechanism position indicators, automatic range finders, and the switches and buttons that are adjusted by the photographer. The microcomputer responds to these inputs to produce control signals for various functions in the camera, such as lens focus, aperture size, shutter operation, mirror movement, and film advance. The control signals, as produced by the microcomputer, are in a digital format; thus necessitating the step of digital-to-analog conversion when an analog output transducer is employed. Wherever possible, it is desirable to eliminate the step of digital-to-analog conversion by employing a transducer that can be driven directly by a digital signal, thereby simplifying the camera mechanism and reducing the overall manufacturing cost. U.S. Pat. No. 4,024,552 issued May 17, 1977 to Toshihiro Kondo, discloses a relatively simple electromechanically actuated optical blade comprising a rectangular planar conductive coil embedded in an opaque plastic blade. The blade is slidably mounted in grooves in the camera body and one of the legs of the rectangular coil resides in the vicinity of a magnetic field that is directed perpendicularly to the plane of the coil. When a current flows in the coil, a force generally perpendicular to one leg of the rectangular coil, is generated; causing the blade to slide in the grooves. Return springs are provided to return the blade to its starting position when the current ceases. Flexible extension leads supply current to the coil from a source within the camera. In one disclosed embodiment, a pair of blades having triangular shaped cutouts cooperate to form progressively larger apertures as the blades move away from each other. The pair of blades are employed as a combination shutter and aperture; and the aperture size is determined by interposing adjustable stops in the paths of the blades.

An improved electromechanical actuator of the planar coil variety is disclosed in U.S. patent application Ser. No. 219,168, filed Dec. 22, 1980 in the name of J. K. Lee and assigned to the present assignee. The actuator, shown in FIG. 1, includes an armature generally designated 20, having a planar coil 22 carried by a coil support member 24. Coil support member 24 is preferably formed from a sheet of insulating material. The coil support member 24 is mounted for movement by a λ-type flexure hinge 26 that defines a virtual pivot point 28 at a point where the extension of the legs of the λ hinge intersect. The flexure hinge provides a low friction mounting and an automatic restoring force to return the armature to an initial position after each operation. Planar coil 22 defines first and second legs 30 and 32 generally perpendicular to the direction of movement of the coil above pivot point 28. A first magnetic field $B_1$, generally perpendicular to the plane of the coil 22 and indicated by the arrowheads as pointing out of the drawing in FIG. 1, lies in the vicinity of the first leg 30. A second magnetic field $B_2$, generally antiparallel to the first magnetic field and indicated by arrowtails as pointing into the plane of the coil in FIG. 1, lies in the vicinity of the second leg 32. Planar coil 22 is electrically connected to a control circuit 34. Current for coil 22, supplied by control circuit 34, is carried along the legs of flexure hinge 26. An aperture blade 40 carried on an end of the coil support member opposite from coil 22, forms a tapered aperture 42 for progressively uncovering a fixed aperture 44 in a camera mechanism plate 46.

Figure 1:
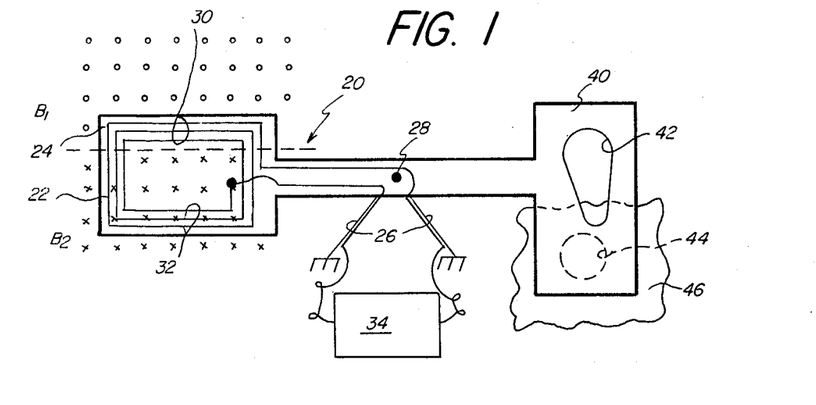
FIG. 1 is a schematic diagram of an electromagnetic shutter/aperture actuator of the type which is controlled by a control circuit according to the present invention.
Figure 2:
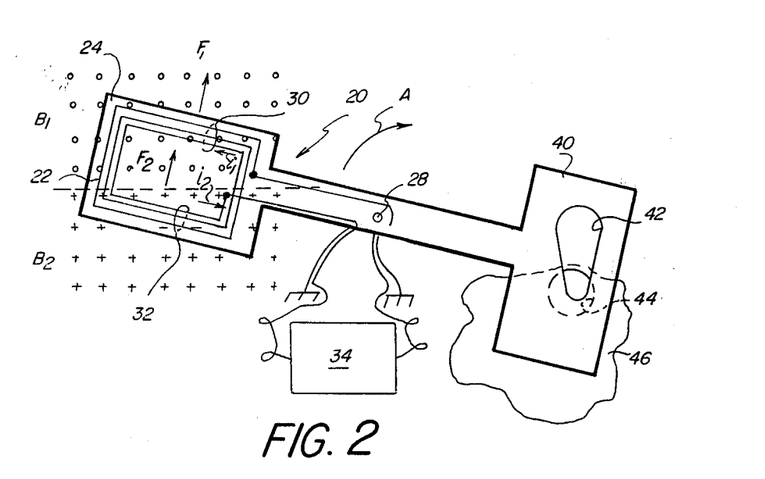
FIG 2 is a schematic diagram similar to FIG. 1, showing the actuator in operation.

Referring now to FIG. 2, when control circuit 34 causes a current $i_1$ to flow in leg 30 of planar coil 22, and a currrent $i_2$ of equal magnitude, to flow in the opposite direction in leg 32 of coil 22, a force $F_1$ is generated on the first leg 30 of planar coil 22 and a force $F_2$ is generated on the second leg 30. The forces $F_1$ and $F_2$ act together to rotate armature 20 around virtual pivot point 28 in the direction of arrow A to displace the aperture blade 40 with respect to the fixed aperture 44, thereby uncovering the fixed aperture as shown in FIG. 2. The amount of movement of aperture blade 40 is controlled by controlling the amount of current in coil 22. When current ceases to flow in planar coil 22, flexure hinge 26 returns the actuator to its original position as shown in FIG. 1.

If position control is attempted by simply controlling the amount of current supplied to the actuator, static friction perturbs the final position achieved by the armature, resulting in position error. The effects of static friction are overcome, and a more reliable, repeatable position control is achieved by applying the driving current in pulses. This technique provides a small dither signal that breaks the remaining static friction. The frequency of the pulses in the control signal is chosen to be somewhat above the cutoff frequency on the frequency versus response curve of the actuator. In a preferred embodiment, the pulse duration is modulated to control the aperture size, and the number of pulses applied to the actuator controls the shutter time.

Figure 3:
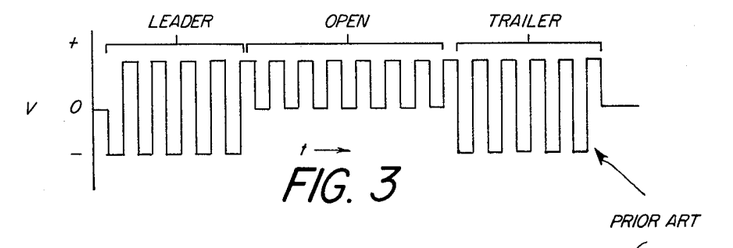
FIG. 3 is waveform diagram illustrative of the type of control signal applied to the actuator of FIG. 1 by the prior art control circuit.
Figure 4:
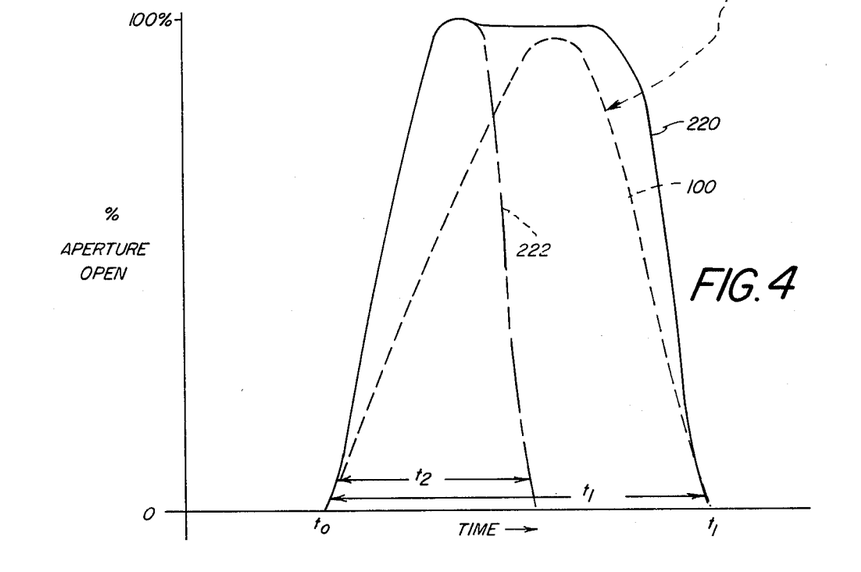
FIG. 4 is a graph of percent aperture opening versus time, useful in describing the response of the actuator of FIG. 1 to applied control signals.

FIG. 3 illustrates a pulse train of the type used to control the actuator. The pulse train comprises a series of 50 percent duty cycle "leader" pulses, centered about 0 Volts, that shake the actuator to break the static friction, without actually causing any substantial movement of the actuator. Next come a series of positive "open" pulses that cause the actuator to move to a position determined by the duty cycle of the open pulses. Finally, a series of 50 percent duty cycle "trailer" pulses allow the actuator to return to the starting position while breaking the static friction. The dashed line labeled 100 in FIG. 4, illustrates the resulting shutter profile in terms of percentage aperture opening with respect to time. As shown in FIG. 4, the shutter was programmed to close as soon as it reached approximately 100 percent aperture opening. The resulting shutter time ($t_1$) represents the shortest shutter time achievable at full aperture.

As can be seen from FIG. 4, the resulting shutter profile is rather "inefficient" in the sense that most of the exposure occurs at apertures less than the desired maximum aperture. Furthermore, in order to provide a more versatile actuator, it is desirable to have shorter shutter times at maximum aperture. For example, experience has shown that typical examples of shutters of the type shown in FIG. 1, are capable of achieving shutter speeds of approximately 1/250 of a second at maximum aperture, shutter speeds of 1/500 to 1/2000 of a second would be desirable. It has not proven to be practical to obtain high shutter speeds by increasing the shutter power and spring stiffness. Doubling the shutter speed would require four times the current and four times stiffer springs, resulting in the use of sixteen times more power to operate the actuator. Furthermore, it has been found that at small apertures, the complex nature of the friction in the shutter results in significant variations in behavior from one shutter actuator to another, and for very small apertures, some shutters fail to open at all. Another problem noted with the planar electromagnetic shutter actuator was the tendency for the shutter to "bounce open" after returning from large apertures.

The problem faced by the inventor therefore, was to increase the speed and reilability of the electromagnetic actuator without substantially increasing the amount of power consumed by the actuator.

SUMMARY OF THE INVENTION

The above noted problems are solved according to the present invention by providing an improved control circuit for an electromagnetic actuator of the type having an armature mounted for movement in a magnetic field, and means for urging the armature toward a rest position. To move the armature quickly and efficiently to a programmed position, the control circuit applies a voltage pulse of a first polarity, magnitude and duration to the armature to move the armature to the programmed position, then applies a voltage pulse of opposite polarity and of duration and magnitude effective to stop the armature at the programmed position. The control circuit applies a periodic train of pulses of said first polarity and of fixed magnitude and duration, effective to hold the armature in the programmed position, the period of said pulse train being above the natural cutoff frequency of the actuator. To quickly return the armature to the rest position, the control circuit applies a pulse of opposite polarity and of duration and magnitude effective to the armature to move the armature in cooperation with the urging means, to the rest position. The circuit then applies a braking pulse of said first polarity and of selected duration and magnitude to stop the armature at the rest position.

In the preferred embodiment of the invention, the actuator controls a shutter/aperture in a camera. The control circuit applies a series of 50 percent duty cycle positive and negative voltage "leader" pulses to the armature. The frequency of the "leader" pulses is above the cutoff frequency of the actuator, for breaking the static friction of the actuator. The control circuit then applies a positive voltage "open" pulse to the conductor for moving the armature against the force of the urging means to a selected position away from the rest position. The control circuit then applies a negative "brake" pulse to the armature for braking the actuator at the selected position. The control circuit applies a periodic pulse train of positive "hold" pulses to the armature to hold the armature at the selected position to open the shutter/aperture to a selected aperture size, the duty cycle of the positive holding pulses determining the selected aperture size, and the number of hold pulses determining the shutter time. The control circuit then applies a negative "close" pulse to the armature for rapidly moving the armature, in cooperation with the urging means to the rest position to close the shutter-/aperture, and then applies a positive "brake" pulse to the armature for braking the armature at the rest position.

According to a further embodiment of the invention, to achieve very short exposure times, the positive holding pulses are at a first voltage, and the positive and negative moving and braking pulses are at a second voltage greater than the first voltage; and the "hold" pulses are optionally eliminated.

BRIEF DESCRIPTION OF THE DRAWINGS

The invention will be described with reference to the accompanying drawings, wherein.

DESCRIPTION OF THE PREFERRED EMBODIMENTS

The control circuit according to the preferred embodiment of the invention, controls an electromagnetic shutter/aperture actuator in a photographic camera. The control circuit includes a programmed microcomputer that receives scene parameter in puts such as scene brightness to produce the appropriate pulse train for driving the shutter/aperture actuator in response to the scene parameter inputs.

Figure 5:
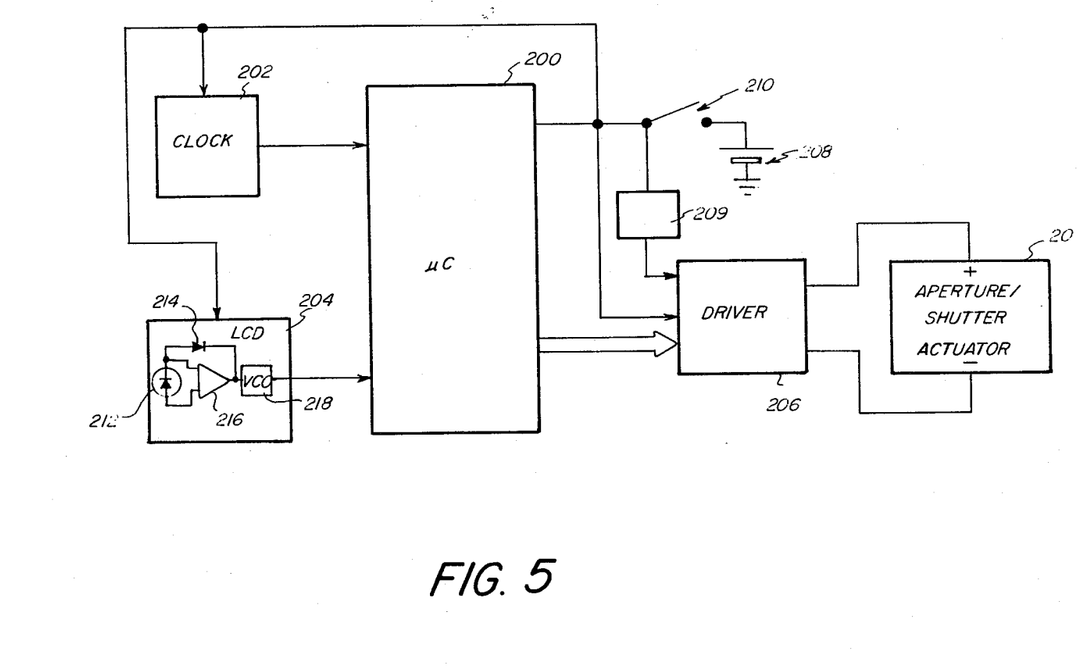
FIG. 5 is an overall schematic circuit diagram of the type of control circuit employed with the actuator of FIG. 1.

FIG. 5 is a schematic diagram of the control circuit used to control the shutter/aperture actuator 20. The control circuit comprises a microcomputer 200 and an output driver 206. A reference oscillator 202 supplies a clock signal to the microcomputer. The circuits are supplied with power from a battery 208 (e.g. 6 volts) through a main power switch 210. The output driver 206 is supplied with high voltage power (e.g. 80 volts) via a DC step-up circuit 209. A light-controlled oscillator 204 including a photosensitive element such as a photodiode 212, a logarithmic feedback diode 214, an operational amplifier 216, and a voltage-controlled oscillator 218 supplies an input signal to the microcomputer. The photodiode, operational amplifier, and feedback diode, are responsive to scene light to produce a voltage proportional to the log of the intensity of the scene light. The voltage is applied to the voltage controlled oscillator to produce a pulse train having a repetition frequency proportional to the log of the intensity of scene light.

In operation, when switch 210 is closed by the operator of the camera, power is supplied from power supply 208 to the rest of the control circuit. The reference oscillator 202 starts to produce clock pulses used to time the operations of the microcomputer, the microcomputer 200 is initialized, and the light-controlled oscillator 204 starts producing a pulse train having a frequency proportional to the log of scene light. The microcomputer 200 is programmed to sample the output of the light controlled oscillator 204 for a predetermined time interval, counting the number of pulses received during the time interval. The final count is proportional to the logarithm of the scene brightness.

The microcomputer employs the final pulse count from the light controlled oscillator to compute a programmed actuator position based on a conventional exposure control program. The microcomputer then constructs a control signal for moving the actuator to the desired position and applies the control signal to output driver 206. Output driver 206 responds to the control signals from the microcomputer to produce a bidirectional drive wave form that is applied to the shutter/aperture actuator 20.

Figure 6:
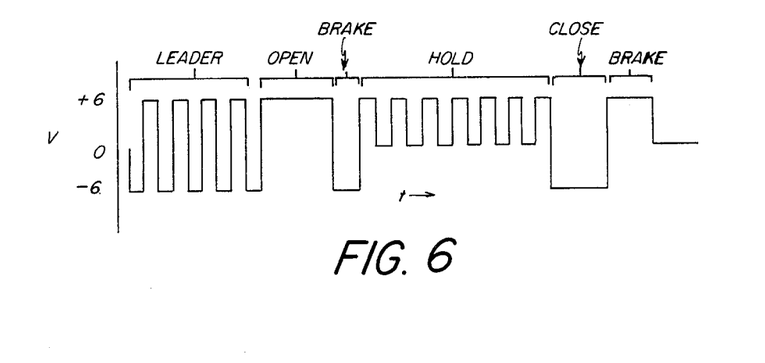
FIG. 6 is a waveform diagram illustrating an improved control signal produced by a control circuit according to the present invention.

Referring now to FIG. 6, the drive wave form comprises a series of 50 percent duty cycle positive and negative "leader" pulses of the low voltage (e.g. 6 volts) to break the static friction of the actuator. Next, a positive "open" pulse of effective duration at the low voltage is applied to the actuator to move the armature to the programmed position, then a negative "braking" pulse of effective duration at the low voltage is applied to stop the armature at the programmed position. The terms positive and negative used throughout the specification and claims are employed merely for convenience to distinguish between pulses of opposite polarity, and are not intended to be limiting. A periodic series of "hold" pulses of effective duration, and duty cycle at the low voltage is applied to the actuator to maintain the actuator at the programmed position for the required time. The period of the hold pulses is above the natural cutoff frequency of the actuator, and the duty cycle of the "hold" pulses is a function of the programmed actuator position. Finally, a negative "close" pulse of effective duration at the low voltage is applied to the actuator to return the actuator to its rest position. As the actuator reaches its rest position, a positive "braking" pulse of effective duration at the low voltage is applied to prevent the actuator from banging into its rest position and rebounding. In FIG. 4, the curve designated 220, represents the percent aperture opening versus time profile for the actuator operated with the improved drive wave form according to the present invention. The total shutter open time ($t_1$) is the same as the minimum open time achievable with the prior art control system. As can be seen from FIG. 4, the shutter profile 220 generated by the control circuit according to the present invention, is much more efficient than the prior art shutter profile 100.

By reducing the number of "hold" pulses applied to the actuator, a much shorter exposure at maximum aperture is possible with the improved control circuit according to the present invention. The minimum exposure at maximum aperture, $t_2$, (for example 1/500 of a second) is illustrated by the chain line wave form 222 in FIG. 4.

Figure 7:
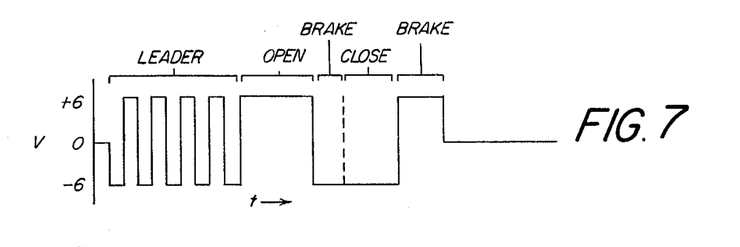
FIG. 7 is a waveform diagram illustrating an improved control signal for achieving the minimum shutter time at the maximum aperture with the improved control circuit according to the present invention.

FIG. 7 shows the control voltage profile for achieving the minimum shutter time $t_2$ at maximum aperture. As shown in FIG. 7, the negative braking pulse and negative closing pulse are contiguous, thereby resulting in the shutter profile 224, shown by a dashed line in FIG. 8.

Still further improvement in the speed and efficiency of actuation of the electromagnetic shutter actuator is achieved according to another feature of the present invention by momentarily "boosting" the voltage (e.g. to ~80 volts) applied to the armature while the actuator is moving. Since this is only for a very short time, the extra energy required is within reasonable limits, and an increase in operating speed by an additional factor of 2 to 4 times is obtained. The normal operating voltage level (e.g. 6 volts) is used for holding the actuator in position, to minimize total energy consumption and reduce the heating of components. For the shutter/aperture actuator, a capacitor is adequate to supply the extra power needed for the few milliseconds during shutter movement. If the camera also features an electronic flash device, the flash charging circuit is used as a convenient source of high voltage.

Figure 8:
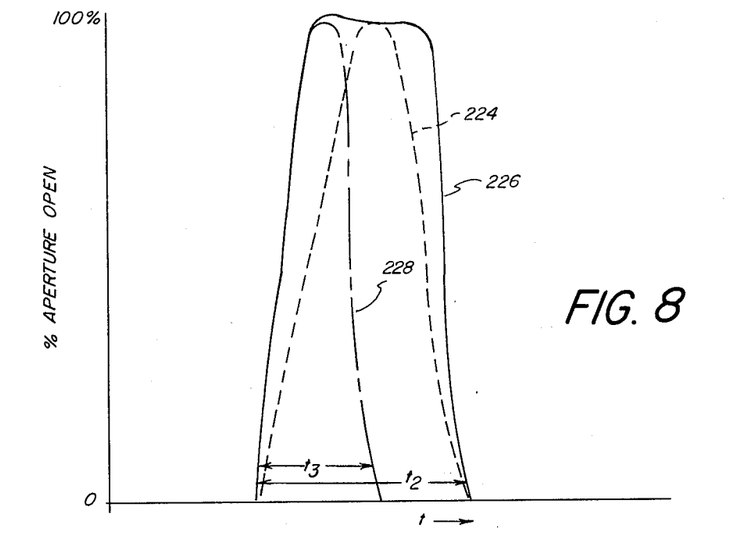
FIG. 8 is a graph of percent aperture opening versus time, useful in describing the response of the actuator in FIG. 1 to the control signals shown in FIGS. 7 and 9.
Figure 9:
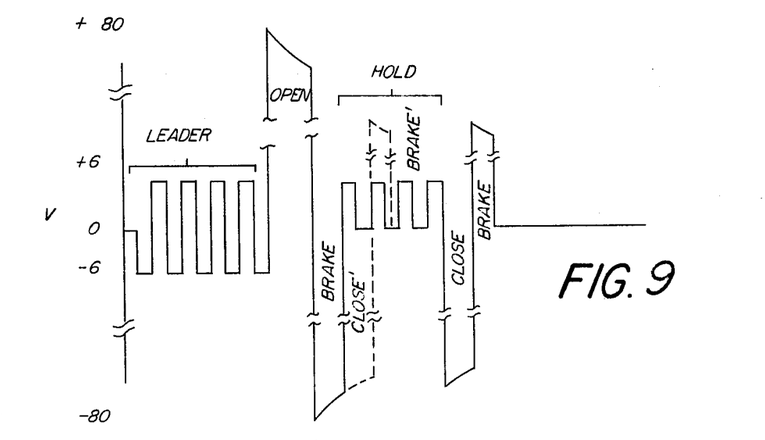
FIG. 9 is a waveform diagram illustrating a further improvement of the control signal according to the present invention.

A voltage profile employing "boosted" moving and braking pulses according to the present invention is shown in FIG. 9. The resulting shutter profile is labeled 226 in FIG. 8. As can be seen in FIG. 8, the shutter actuation is even more efficient than the profile 224 produced without the "boosted" moving and braking pulses. With the increased efficiency, shorter shutter actuation times can be achieved by reducing or eliminating the number of "holding" pulses. The minimum shutter time achievable at maximum aperture is produced by the wave form shown in the dotted lines in FIG. 9 with the moving pulses labeled "CLOSE" and "BRAKE". The resulting shutter profile labeled 22 in FIG. 8, produces a shutter time $t_3$ approximately one-half (e.g. 1/1000 of a second) of the fastest shutter time achievable without the boost.

Figure 10:
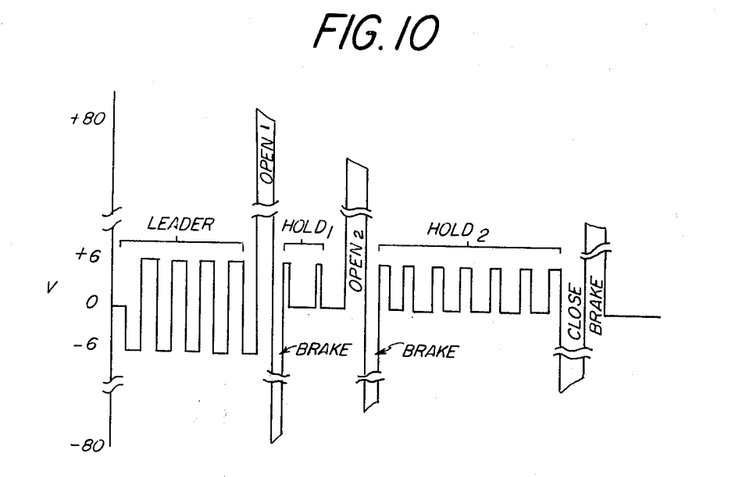
FIG. 10 is a waveform diagram illustrating a control signal according to the present invention for achieving a multiple step shutter profile.
Figure 11:
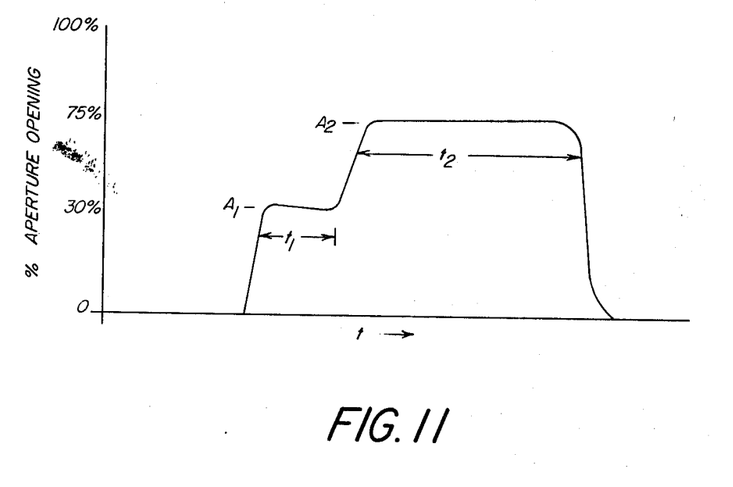
FIG. 11 is a graph of percent aperture opening versus time, useful in describing the response of the actuator to the multi-step control signal shown in FIG. 10.

With the highly efficient shutter profiles achievable with the "boosted" moving and braking pulses according to the present invention, multiple step shutter control can be effected. For example, it is desirable to take a picture at close range using an electronic flash and a relatively small aperture, and to fill in the background exposure using ambient light and a larger aperture. A shutter profile like that shown in FIG. 11 accomplishes this. First the shutter is opened to some relatively small aperture $A_1$ for a relatively short time $t_1$ while the main subject is illuminated with electronic flash, then the shutter is opened to a relatively larger aperture $A_2$ for a longer period of time $t_2$ while the background is exposed with ambient light. The control voltage profile generated by a control circuit according to the present invention, which achieves the multi-step shutter actuation, is shown in FIG. 10. The profile comprises a series of "leader" pulses then a first "boosted" pulse and a first "boosted" "braking" pulse to open the shutter to the first aperture, a forst series "hold" pulses ($HOLD_1$) to hold the shutter at the first aperture, then a second set of "boosted" "open" and "boosted" "braking" pulses to further open the shutter to the second aperture. A second series of "hold" pulses ($HOLD_2$) hold the shutter at the second aperture, and finally "boosted" "closing" and "braking" pulses close the shutter.

Figure 12:
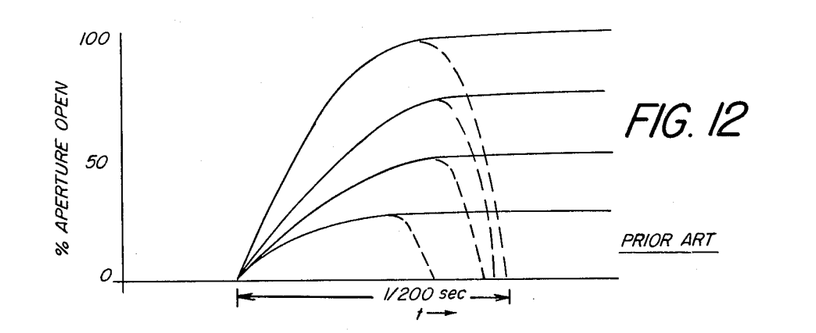
FIG. 12 is a qualitative plot of percent aperture opening versus time useful in describing the response of the actuator in FIG. 1 to signals produced by the prior art control circuit for several aperture sizes.
Figure 13:
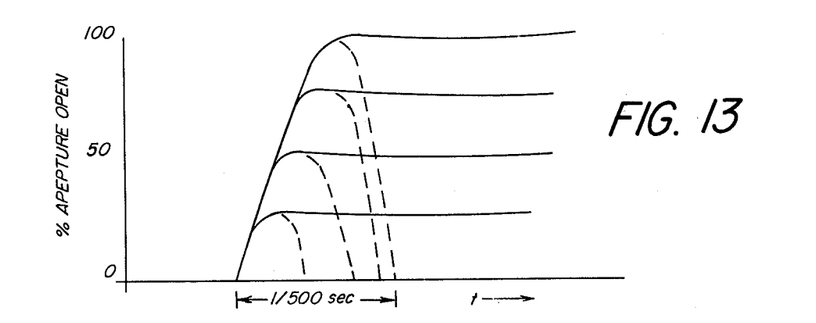
FIG. 13 is a qualitative plot of percent aperture opening versus time useful in describing the response of the actuator in FIG. 1 to signals produced by the control circuit according to the present invention.
Figure 14:
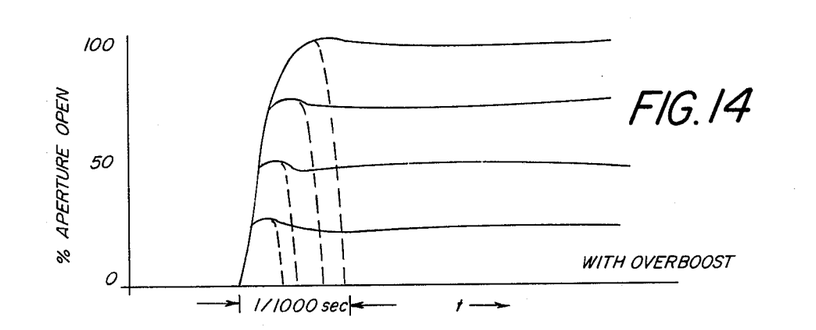
FIG. 14 is a qualitative plot of aperture opening versus time useful in describing the response of the actuator in FIG. 1 to the further improved signals produced by the control system according to the present invention.

FIGS. 12-14 provide a qualitative comparison of the operation of the planar electromagnetic actuator using a prior art control circuit with the operation of the planar electromagnetic actuator using a control circuit according to the present invention. The solid lines in FIG. 12 illustrate the shutter opening profile for several different apertures produced by the control circuit according to the prior art. The dotted lines in FIG. 12 illustrate the shortest exposure times achievable at the respective apertures. In the shutters actually tested, the shortest times at maximum aperture were about 1/200 of a second.

The solid lines in FIG. 13, drawn to the same scale as FIG. 12, illustrates the shutter opening profiles achieved by employing a control circuit according to the present invention. The dotted lines in FIG. 13 represents the shortest exposure times at the respective apertures. As can be seen by comparing FIGS. 12 and 13, the shutter opening profiles produced by the drive circuit according to the present invention are more efficient than those produced by the prior art drive circuit and the minimum shutter times achievable at maximum aperture are much shorter, about 1/500 of a second in the shutters tested.

The solid lines in FIG. 14 illustrate the shutter opening profiles achieved with the drive circuit employing "boosted" open and closing pulses according to the present invention. The dotted lines in FIG. 14 represent the minimum shutter times achievable using the "boosted", opening and closing pulses and demonstrate the further improvement in minimum shutter times achieved. In the shutters tested, shutter speeds of less than 1/1000 of a second at maximum aperture were achieved.

Figure 15:
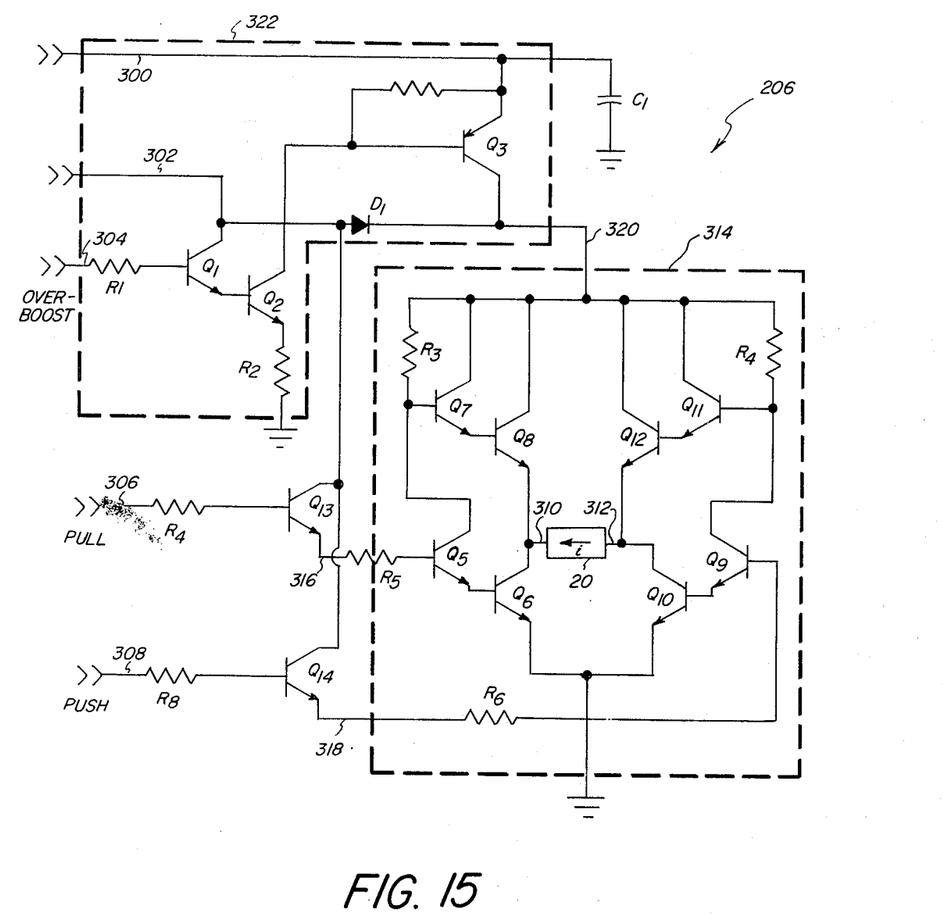
FIG. 15 is a schematic circuit diagram of a presently preferred drive circuit employed in the control circuit according to the present invention.

FIG. 15 shows a presently preferred output driver circuit adapted to be controlled by a microcomputer for producing an actuator control signal according to the present invention. The driver circuit 206 includes a high voltage input (e.g. 80 volts) 300, a low voltage input (e.g. 6 volts) 302, three digital control inputs 304, 306, and 308, and complementary outputs 310 and 312. The armature of the aperture/shutter actuator 20 is connected across the complementary outputs. The driver circuit comprises a high-gain differential amplifier 314 having differential inputs 316 and 318 and a supply voltage input 320. A supply voltage control circuit 322, includes a pair of NPN transistors $Q_1$ and $Q_2$, a PNP transistor $Q_3$, and a diode $D_1$. The base of transistor $Q_1$ is connected through a resistor $R_1$ to the control input 304. The collector of transistor $Q_1$ is connected to the low voltage power input 302, and its emitter is connected to the base of transistor $Q_2$. The collector of transistor $Q_2$ is connected to the base of transistor $Q_3$, and its emitter is returned to ground through resistor $R_2$. The emitter of transistor $Q_3$ is connected in parallel to the high voltage power input 300 and to one terminal of a storage capacitor $C_1$. The collector of transistor $C_3$ is connected to the low voltage power input 302 through diode $D_1$, and to the supply voltage input 320 of differential amplifier 314. Differential amplifier 314 comprises eight transistors $Q_5$–$Q_{12}$. Input 316 of differential amplifier 314 is connected to the base of transistor $Q_5$. The collector of transistor $Q_5$ is connected through resistor $R_3$ to the supply voltage input 320, and its emitter is connected to the base of transistor $Q_6$. Transistors $Q_7$ and $Q_8$ are connected as a conventional Darlington pair between the supply voltage input 320 and the collector of transistor $Q_6$. Output 310 is connected to ground through transistor $Q_6$ and to supply input 320 through transistor $Q_8$. Similarly, input 318 of differential amplifier 314 is connected to the base of transistor $Q_9$, and the emitter of transistor $Q_9$ is connected to the base of transistor $Q_{10}$. The collector of transistor $Q_9$ is connected through a resistor $R_4$ to the supply voltage input 320. Transistors $Q_{11}$ and $Q_{12}$ are connected as a conventional Darlington pair between the power supply voltage input 320 and the collector of transistor $Q_{10}$. Output 312 is connected to ground through transistor $Q_6$ and to the supply voltage input 320 through transistor $Q_{12}$.

Input 316 is connected in series to the low voltage input 302 through a transistor $Q_{13}$ and resistor $R_5$. Similarly, input 318 is connected to the low voltage input 302 through transistor $Q_{14}$ and resistor $R_6$. The base of transistor $Q_{13}$ is connected through a resistor $R_7$ to control input 306, and the base of transistor $Q_{14}$ is connected through a resistor $R_8$ to control input 308.

In operation, when the control inputs 306 and 308 are both grounded, i.e. logical zeroes are applied from the microcomputer, very little current is drawn by the differential amplifier 314. If a logical zero (ground) is applied to control input 304, transistors $Q_1$ and $Q_2$ are turned off, causing transistor $Q_3$ to remain off and the low voltage (e.g. 6 Volts) is applied to the supply voltage input 320 of differential amplifier 314 through diode $D_1$. When a logical one (e.g. 6 Volts) is applied to the control input 304, transistors $Q_1$ and $Q_2$ are turned on, thereby lowering the voltage on the base of transistor $Q_3$, causing it to conduct and apply the high voltage (e.g. 80 Volts) to the supply voltage input 320.

When a logical one is applied to control input 306, transistor $Q_{13}$ begins to conduct, thereby raising the voltage on the base of transistor $Q_5$, causing transistor $Q_5$ to conduct, thereby turning on transistor $Q_6$ and drawing output 310 toward ground. Transistors $Q_7$ and $Q_8$ remain off. Output 312 connected to output 310 through actuator 20 is drawn toward ground and the emitter voltage of transistors $Q_{11}$ and $Q_{12}$ is lowered, thereby turning them on. Current i flows through the actuator in the direction indicated by the arrow in FIG. 15. When the logical one is removed from input 306, the current flow is stopped. When a logical one is applied instead to input 308, the current flow is reversed. Thus the drive circuit is responsive to a three-bit binary input signal supplied on inputs 304, 306, and 308 respectively, to produce the output voltages shown in Table I, below:

TABLE I

| Inputs | | | |
|---|---|---|---|
| 304 | 306 | 308 | Outputs |
| 0 | 0 | 0 | 0 Volts |
| 0 | 1 | 0 | Low Voltage "Positive Pulse" |
| 0 | 0 | 1 | Low Voltage "Negative Pulse" |
| 1 | 1 | 0 | High Voltage "Positive Pulse" |
| 1 | 0 | 1 | High Voltage "Negative Pulse" |

By applying the desired bit pattern to the drive circuit, the microcomputer causes the drive circuit to generate control signals according to the present invention.

With the control signals according to the present invention, the positive closing and braking action produced by the improved actuator drive wave form results in complete closure of the shutter actuator without any shutter bounce.

As described above, the control circuit according to a presently preferred embodiment of the invention produces a wave form consisting of four parts, a series of "leader" pulses prior to opening the shutter to break the static friction and settle the shutter actuator into position, a rapid opening motion comprising a positive pulse and a negative pulse to open the shutter and bring it to rest in the open position, a train of periodic positive "hold" pulses to hold the actuator in position, and a rapid closing motion comprising a negative pulse and a positive pulse to close and park the shutter at its rest position.

For very high speed shutter operation and for extremely short shutter times, "boosted" opening and closing pulses may be used during the opening and closing motions, and the holding pulses may be eliminated. The "leader" pulses comprise a 50 percent duty cycle positive and negative square wave, preferably about 4 to 10 times the resonant frequency of the sutter actuator. If the frequency is too high, the vibration induced in the actuator will not have sufficient amplitude to break the static friction. On the other hand, excessive amplitude due to too low a frequency can result in inadvertent shutter opening, and erratic operation. In any event, the actual frequency employed appears not to be critical in the range of between 4 to 10 times the cutoff frequency of the actuator. The number of "leader" pulses should allow sufficient time for settling. Usually about one resonant period of the actuator is sufficient. For example, with a 50 Hz resonant actuator, 20 milliseconds of leader pulses at 1 KHz is sufficient.

The opening motion has two components, a positive pulse to produce opening acceleration, and a negative pulse, to produce braking acceleration. The duration of the positive pulse is approximately a linear function of the distance or strokes that the armature must be moved, and is of the form:

$$T_1 = (K_1 \times S) + K_2 \quad (1)$$

where $T_1$ is the time duration of the opening pulse;
S is the desired stroke or distance that the armature must be moved; and
$K_1$ and $K_2$ are constants.

This equation is an empirically derived relationship between the time $T_1$ and the desired stroke S, and is related to the moments of inertia, spring constants, and damping characteristics of the shutter. The opening stroke is mostly determined by the length of this positive pulse. The negative braking pulse decelerates the armature to leave it stationary at the desired position. This force is in the same direction as the spring force on the armature, and thus has a somewhat more complex form. Test show a pronounced second derivative in the braking time $T_2$ of the armature. An empirically derived formula for modeling the behavior of the shutter during braking is:

$$T_2 = (-K_3 \times S^2) + (K_4 \times S) + K_5 \quad (2)$$

where $T_2$ is the time duration of the braking pulse; and
$K_3$-$K_5$ are constants.

The duty cycle required to hold the armature in the desired position is very nearly a linear function of the distance that the armature must move and is modeled by the equation:

$$T_3 = (K_6 \times S) + K_7 \quad (3)$$

where $T_3$ is the time duration of the positive portion of the holding pulse; and
$K_6$ and $K_7$ are constants.

The closing cycle components are modeled in a manner similar to the opening cycle. The negative closing pulse tends to be linear with distance and is modeled by the following equation:

$$T_4 = (K \times S) + K_9 \quad (4)$$

where $T_4$ is the time duration of the closing pulse; and
$K_8$ and $K_9$ are constants.

The positive closing braking pulse is determined by the rest position and is modeled by the following equation:

$$T_5 = (K_{10} \times S) + K_{11} \quad (5)$$

where $T_5$ is the time duration of the closing braking pulse; and
$K_{10}$ and $K_{11}$ are constants.

Generally, it appears to be desirable to almost close the actuator under full drive, and to almost, but not quite, cancel the closing velocity in order to avoid the shutter actuator from sticking open or bouncing.

A flow chart for programing the microcomputer to control the shutter actuator, employing the modeling equations (1) through (5) described above, is shown in FIG. 16. First, the computer measures the scene brightness by sampling the output of light controlled oscillator 204 for a predetermined time. Based on the scene brightness measurement, the computer determines a desired aperture size D and a shutter time ST, using a conventional exposure control equation. The desired aperture D is converted to a desired stroke S, and the stroke S is used to compute the pulse duration times $T_1$-$T_5$ for the shutter control waveform, according to the modeling equations (1) through (5) described above. The pulse duration times are then employed to compile a table of control values used by a Waveform Generator Subroutine.

Figure 17:
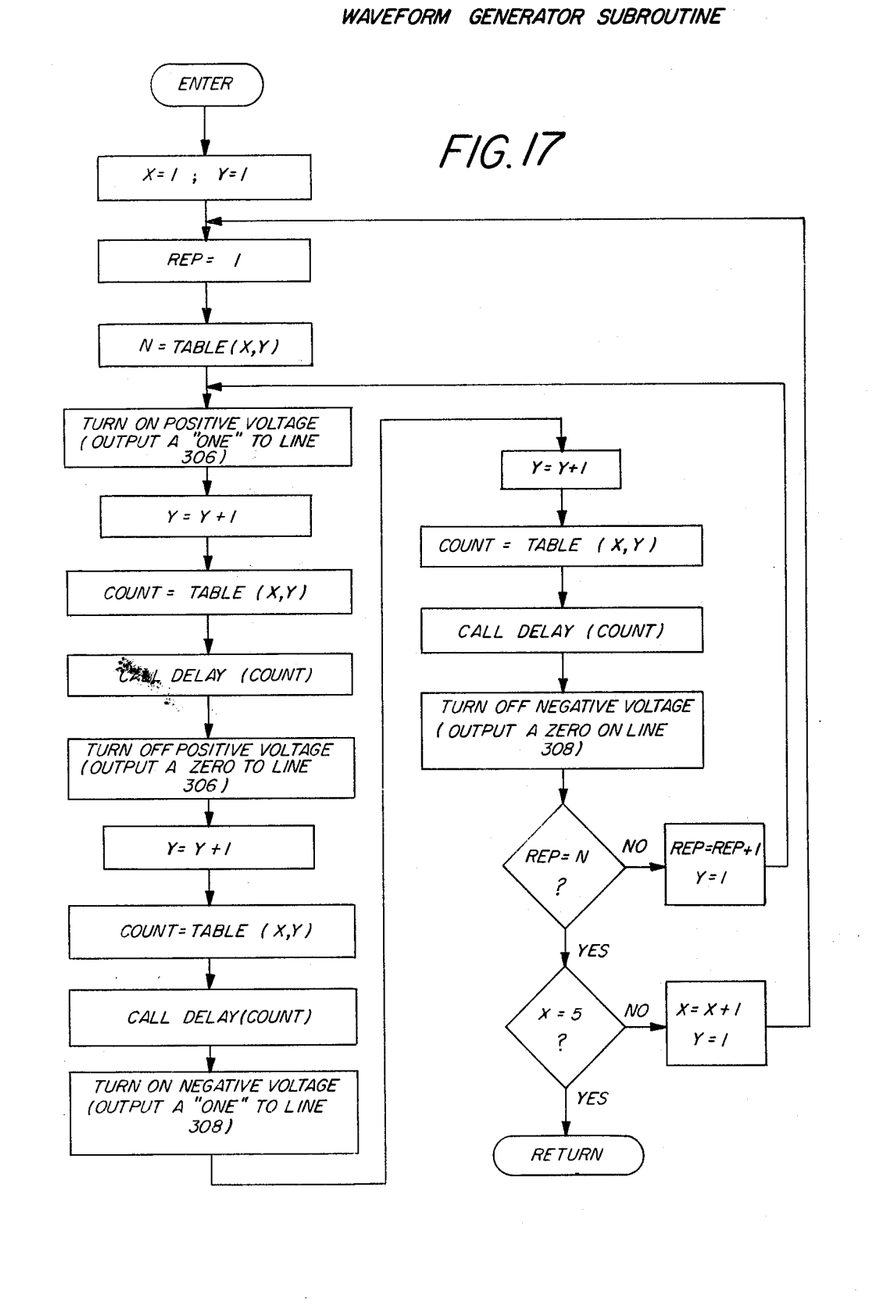
FIG. 17 is a flow chart of a Waveform Generator Subroutine employed in the program shown in FIG. 16.

A flow chart of the Waveform Generator Subroutine is shown in FIG. 17. The subroutine constructs a shutter control waveform by compiling multiple repetitions of a basic waveform subunit, shown in FIG. 18.

Figure 18:
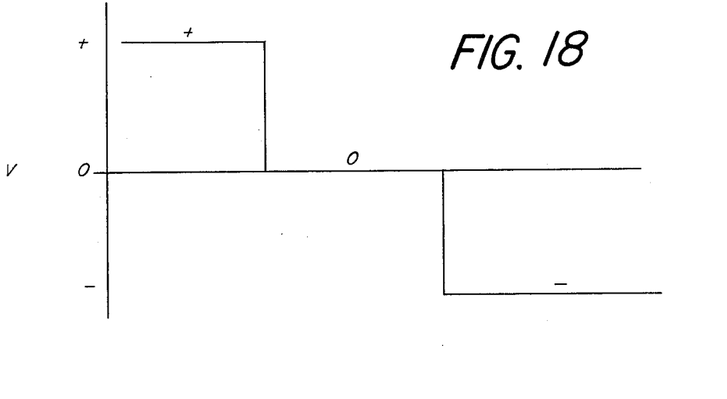
FIG. 18 is a waveform diagram showing a basic waveform subunit generated by the Waveform Generator Subroutine shown in FIG. 17.

The basic waveform subunit includes a positive portion (+), a zero portion (0), and negative portion (−). During the positive portion of the waveform subunit, the microcomputer outputs a logical one on line 306 and a logical zero on line 308 (see FIG. 15) to cause driver 206 to apply a positive voltage across the shutter actuator 20. During the zero portion of the waveform subunit, the microcomputer outputs a logical zero on lines 306 and 308, to cause driver 206 to apply no voltage across the shutter actuator. During the negative portion of the waveform subunit, the microcomputer outputs a zero on line 306 and a logical one on line 308, thereby causing driver 206 to apply a negative voltage across the shutter actuator. The duration of each portion of the basic waveform subunit is controlled by a Delay Subroutine shown in FIG. 19.

Figure 19:
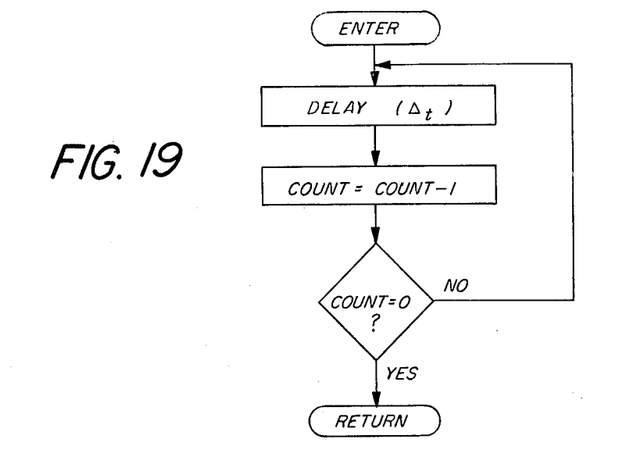
FIG. 19 is a flow chart of a Delay Subroutine employed in the Waveform Generator Subroutine shown in FIG. 17.

When the Delay Subroutine is called, a variable quantity COUNT is set between 1 and 255. The Delay Subroutine loops through a delay step (e.g. 0.1 m/sec.) comprising a fixed multiple of the microcomputer clock period. The number of loops through the delay step is determined by COUNT, which is decremented each time through the loop, until COUNT equals zero. Control is then returned to the Waveform Generator Subroutine. The operating constants $K_1$-$K_{11}$ are chosen so that the times $T_1$-$T_5$ represent multiples of the delay step.

The various control values required to generate the shutter/actuator control waveform are compiled by the main program and stored in a TABLE (TABLE (X,Y)) having 5 rows and 4 columns. The first row of the TABLE (X=1), shown in FIG. 16, contains the control values for generating the "leader" portion of the shutter control waveform, comprising a 50 percent duty cycle positive and negative pulse train. The first column (Y=1) of the TABLE contains the number of times that the waveform subunit is to be repeated (e.g. 20 times for the "leader" portion of the waveform). Column 2 (T=2) contains the delay count (e.g. 25) for the positive portion of the waveform subunit. Column 3 (T=3) contains the delay count (e.g. 1) for the zero portion of the waveform subunit, and column 4 (Y=4) contains the delay count (e.g. 25) for the negative portion of the waveform subunit.

The second row of the TABLE (X=2) contains the control values for generating the positive "open" pulse and the negative "braking" pulse. As shown in the TABLE in FIG. 16, the values in columns 2 and 4 are the calculated times $T_1$ and $T_2$.

Figure 16:
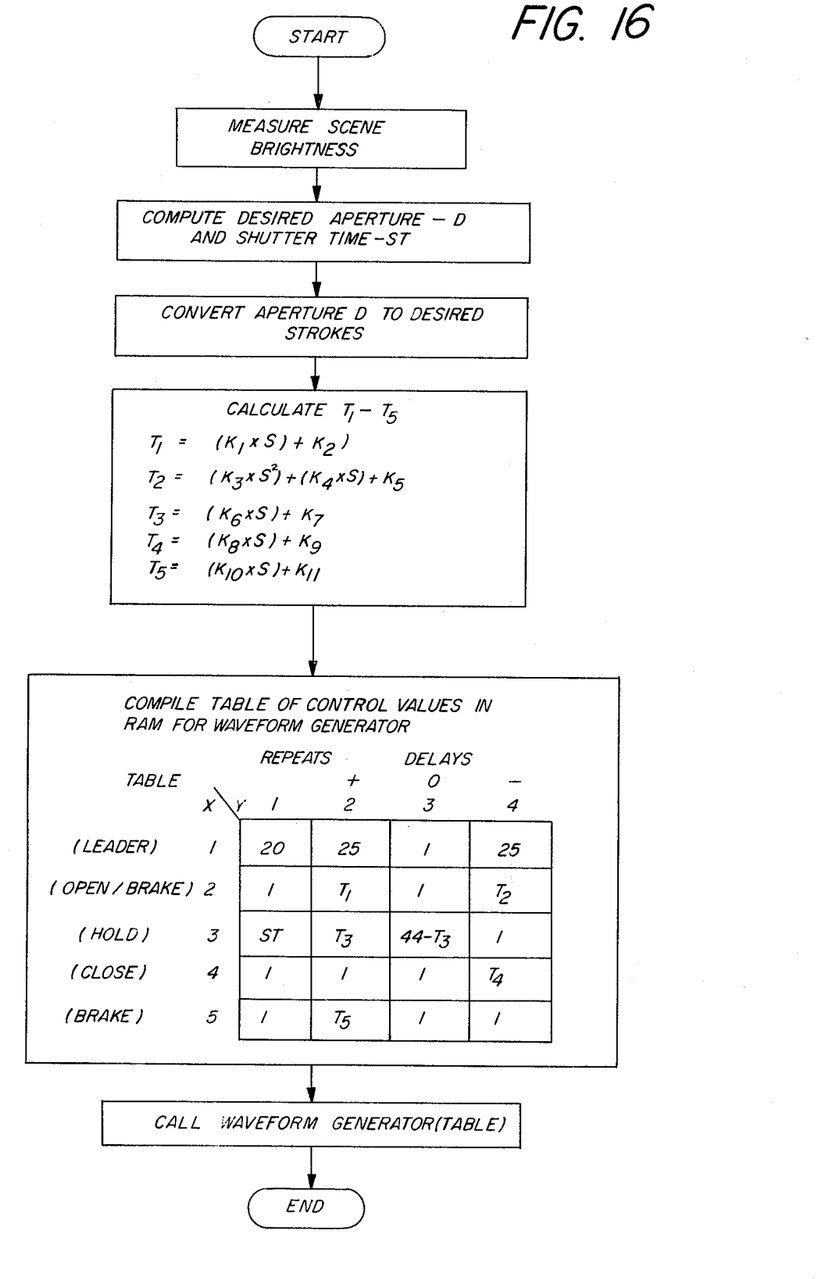
FIG. 16 is a flow chart for programming the digital computer in the control circuit according to the present invention.

The third row of the TABLE (X=3) contains the control values for generating the "hold" pulses in the actuator control waveform. The number of repetitions is determined by the desired shutter time ST. The values of constants $K_6$ and $K_7$ are chosen such that the shutter time ST is expressed as a multiple of the hold pulse (e.g. 44 delays). The positive and zero portions of the waveform subunit are the times $T_3$ and 44-$T_3$, as shown in FIG. 16.

The fourth row of the TABLE (X=4) contains the control values for generating the negative closing pulse. The duration of the negative portion of the waveform subunit is the time $T_4$ calculated above.

The fifth row of the TABLE (X=5) contains the control values for generating the positive braking pulse. The duration of the positive portion of the waveform subunit is the time $T_5$ computed above.

Computed control values for producing a typical shutter actuation are shown in Table II.

TABLE II

| TABLE X \ Y | REPEAT | DELAYS + | 0 | − |
|---|---|---|---|---|
| LEADER | 20 | 25 | 1 | 25 |
| OPEN/BRAKE | 1 | 40 | 1 | 30 |
| HOLD | 20 | 10 | 40 | 1 |
| CLOSE | 1 | 1 | 1 | 30 |
| BRAKE | 1 | 20 | 1 | 1 |

The Waveform Generator Subroutine sets internal counters X, Y and REP equal to one. It then sets a constant (N) equal to the first value in the first row of the TABLE using a pointer TABLE (X,Y) to select the entry from the TABLE. Next it turns on the positive voltage by outputting a one to line 306 (see FIG. 15). It increments Y by 1, thereby causing TABLE (X,Y) to point to the second value in the first row of the TABLE. It sets a variable (COUNT) equal to the indicated value in the TABLE. It then calls the Delay Subroutine, which executes a delay proportional to the value of COUNT. The positive voltage is turned off, the pointer is stepped to the next location in the TABLE, and the Delay Subroutine is called once more. Finally, the negative voltage is turned on, the pointer is stepped, and the Delay Subroutine is called to complete the first basic waveform subunit. After the first unit is completed, the counter REP is checked to see if the required number of repetitions of the waveform subunit have been performed. If not, the program increments REP, sets Y=1 and repeats the waveform subunit. If the required number of repetitions have been performed, the program checks to see if the waveform generation is complete; if not, it increments X, sending the program to the next row in the TABLE, resets Y=1, and returns to the start of the program. If the waveform generation is complete, the subroutine returns to the main program.

Figure 20:
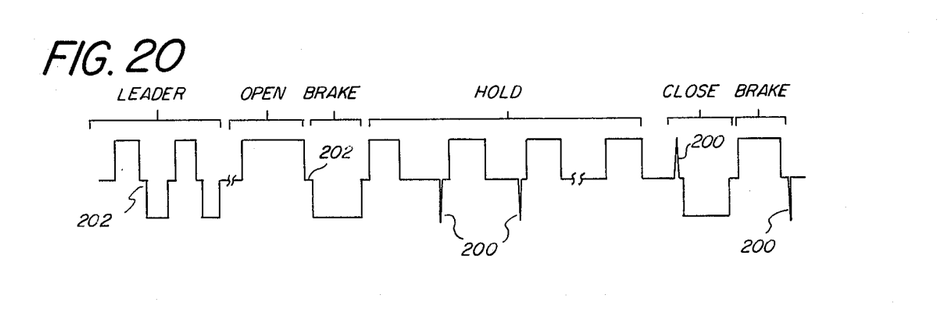
FIG. 20 is a waveform diagram showing a typical shutter/actuator control waveform generated by the control circuit according to the present invention.

The control voltage waveform produced by the Waveform Generator Subroutine using the control values in Table II is shown in FIG. 20. The positive and negative voltage spikes 200, and the small plateaus of zero voltage 202 are merely vestiges of the particular method employed for generating the voltage waveform, and have no effect on the operation of the actuator.

The TABLE of control values can be extended to provide an extra column for "overboost", and also extra rows can be added to provide for a multiple control waveform such as that shown in FIG. 10.

The invention has been described with reference to preferred embodiments thereof, however, it will be apparent that changes and modifications can be effected within the spirit and scope of the accompanying claims.

I claim:

1. In photographic apparatus having an electromagnetic actuator of the type including an armature mounted for movement between a rest position and an extreme position in a magnetic field and means for urging the armature toward the rest position, a control circuit comprising:
   means for applying a first polarity voltage pulse to said armature of duration effective for moving said armature against the force of said urging means to a programmed position between said rest position and said extreme position; and
   means for applying an opposite polarity voltage pulse to said armature of duration effective for braking said armature at said programmed position.

2. The invention claimed in claim 1, wherein said actuator controls an aperture/shutter in a photographic camera, and wherein said programmed position corresponds to a programmed aperture size.

3. The invention claimed in claim 1, further comprising:
   means for applying to said armature a voltage pulse of said opposite polarity, of duration effective for moving said armature to said rest position; and
   means for applying a voltage pulse of said first polarity of duration effective for braking said armature at said rest position.

4. The invention claimed in claim 3, further comprising:
   means for applying, after said opposite polarity braking pulse, a periodic train of first polarity voltage pulses of duty cycle effective for holding said armature at said programmed position, the frequency of said first polarity holding pulses being above the cutoff frequency of said actuator.

5. The invention claimed in claim 4, wherein said actuator controls an aperture/shutter in a photographic camera, wherein said programmed position corresponds to a programmed aperture size, and wherein the length of said periodic train of holding pulses corresponds to a programmed shutter time.

6. The invention claimed in claim 4, wherein said "holding" pulses are a first voltage, and said moving and braking pulses are a second voltage, greater than said first voltage.

7. The invention claimed in claim 4, further comprising:
   means for applying to said armature, prior to said first moving pulse, a series of 50 percent duty cycle "leader" pulses, the frequency of said leader pulses being above the cutoff frequency of said actuator.

8. The invention claimed in claim 7, wherein the frequency of said "leader" pulses and said holding pulses is about 4 to 10 times the cutoff frequency of said actuator, and wherein said "leader" pulses are applied for about one resonant period of said actuator.

9. In photographic apparatus having an electromagnetic actuator of the type including an armature with an electrical conductor, means for producing a magnetic field in the vicinity of the armature, means for mounting the armature for relative movement with respect to the field producing means between a rest position and an extreme position in response to an electrical current in the conductor, and urging means connected to the armature for urging the armature toward the rest position, an improved actuator control circuit comprising:
   means for applying a series of 50 percent duty cycle positive and negative voltage "leader" pulses to said conductor, the frequency of said "leader" pulses being above the cutoff frequency of said actuator, for overcoming the static friction of said actuator;
   means for applying a positive voltage pulse to said conductor of duration effective for moving said armature against the force of said urging means to a programmed position away from said rest position;
   means for applying a negative voltage pulse to said conductor of duration effective for braking said armature at said programmed position;
   means for applying a negative pulse to said conductor of duration effective for moving said armature in cooperation with said urging means to said rest position; and
   means for applying a positive pulse to said conductor of duration effective for braking said armature at said rest position.

10. The invention claimed in claim 9, further comprising means for applying after said negative braking pulse, a periodic train of positive pulses to said conductor of duty cycle effective for holding said armature at said selected position, the frequency of said positive "holding" pulses being above the cutoff frequency of said actuator.

11. The invention claimed in claim 10, wherein said actuator controls an aperture/shutter in a photographic camera; wherein said programmed position corresponds to a programmed aperture size, and wherein the length of said periodic pulse train of holding pulses corresponds to a programmed shutter time.

12. The invention claimed in claim 10, wherein said positive "holding" pulses are a first voltage, and said positive and negative moving and braking pulses are a second voltage greater than said first voltage.

13. The invention claimed in claim 10, further comprising means for applying a second positive moving pulse and a negative braking pulse to said armature after said plurality of "holding" pulses, of respective durations effective to move and brake said armature to a second programmed position, and means for applying a second train of periodic pulses of duty cycle effective for holding said armature in said second selected position.

14. The invention claimed in claim 10, wherein the frequency of said "leader" pulses and said "holding" pulses is about 4 to 10 times the cutoff frequency of said actuator, and wherein said "leader" pulses are applied for about one resonant period of said actuator.

15. A method of controlling an electromagnetic actuator of the type having an armature including an electrical conductor, means for producing a magnetic field in the vicinity of the armature, means for mounting the armature for relative movement with respect to the field producing means between a rest position and an extreme position in response to an electrical current in the armature, and urging means connected to the armature for urging the armature toward the rest position, said method comprising the steps of:
   applying a series of 50 percent duty cycle positive and negative voltage "leader" pulses to said conductor, the frequency of said leader pulses being above the cutoff frequency of said actuator, for overcoming the static friction of said actuator;

applying a positive voltage pulse to said conductor of duration effective for moving said armature against the force of said resilient means to a programmed position between said rest position and said extreme position;

applying a negative pulse to said conductor of duration effective for braking said armature at said programmed position;

applying a negative pulse to said conductor of duration effective for moving said armature in cooperation with said urging means to said rest position; and applying a positive pulse to said conductor of duration effective for braking said armature at said rest position.

16. The invention claimed in claim 15, further comprising the step of applying a periodic train of positive pulses, after said negative braking pulse, to said conductor of duty cycle effective for holding said armature at said programmed position, the frequency of said positive holding pulses being above the cutoff frequency of said actuator.

17. The invention claimed in claim 16, wherein said positive holding pulses are at a first voltage, and the voltages of said positive and negative moving and braking pulses are greater than said first voltage.

18. The invention claimed in claim 15, wherein the frequency of said "leader" pulses and said "holding" pulses is about 4 to 10 times the cutoff frequency of said actuator, and wherein said leader pulses are applied for about one resonant period of said actuator.

19. The invention claimed in claim 16, further comprising the steps of:
 applying a second positive moving pulse to said armature after said "holding" pulses of duration effective to move said armature to a second programmed position;
 applying a second negative braking pulse of duration effective to arrest said armature at said second programmed position; and
 applying a second periodic train of "holding" pulses of duty cycle effective to hold said armature at said second selected position.

20. In a photographic apparatus, a control circuit for an electromagnetic actuator of the type having an armature including an electrical conductor, means for producing a magnetic field in the vicinity of the armature, means for mounting the armature for relative movement with respect to the field producing means between a rest position and an extreme position in response to an electrical current in the conductor, and urging means connected to the armature for urging the armature toward a rest position, said control circuit comprising:
 a microcomputer, including a memory containing a control program, having first and second digital signal output lines;
 a first electrical power supply; and
 drive circuit means, including a high gain differential amplifier, connected to said microcomputer, to said power supply, and to said electromagnetic actuator for supplying electrical current to said armature under control of said microcomputer, said differential amplifier having a power input connected to said power supply, first and second differential inputs connected to said first and second digital output lines, and first and second complementary power outputs for connection to said actuator, said differential amplifier being responsive to a logical one on said first input and a logical zero on said second input for producing a positive voltage across said complementary outputs, responsive to a logical zero on said first input and a logical one on said second input for producing a negative voltage across said outputs, and responsive to a logical zero applied to both said first and second inputs for producing no voltage across said outputs,
 said microcomputer being programmed to cause said drive circuit means to produce across said complementary outputs: (1) a series of 50 percent duty cycle positive and negative voltage "leader" pulses, the frequency of said leader pulses being above the cutoff frequency of said actuator, for overcoming the static friction of said actuator; (2) a positive voltage pulse of duration effective for moving said armature against the force of said resilient means to a programmed position between said rest position and said extreme position; (3) a negative voltage pulse of duration effective for braking said armature at said programmed position; (4) a negative voltage pulse of duration effective for moving said armature in cooperation with said urging means to said rest position; and (5) a positive voltage pulse of duration effective for braking said armature at said rest position.

21. The invention claimed in claim 20, wherein said microcomputer is also programmed to produce a periodic train of positive voltage "holding" pulses, after said negative braking pulse, of duty cycle effective for holding said armature at said programmed position, the frequency of said positive voltage pulses being above the cutoff frequency of said actuator.

22. The invention claimed in claim 21, wherein said actuator controls an aperture/shutter in a photographic camera; wherein said programmed position corresponds to a programmed aperture size, and wherein the length of said periodic pulse train of holding pulses corresponds to a programmed shutter time.

23. The invention claimed in claim 21, further comprising:
 a second electrical power supply having a higher voltage than said first electrical power supply;
 a supply voltage control circuit connected to said first and second power supplies, and having a control input and a voltage output, and being responsive to a logical zero on said control input for producing the voltage of said first power supply on said voltage output, and to a logical one on said control input for producing the voltage of said second power supply on said voltage output, said voltage output being connected to said power input of said differential amplifier,
 said microcomputer further having a third digital output connected to said control input of said supply voltage control circuit, and said microcomputer being programmed to cause said supply voltage control circuit to apply said voltage from said second electrical power supply during said "leader" pulses and said "holding" pulses, and to cause said supply voltage control circuit to apply said voltage from said first electrical power supply during said moving and braking pulses.

* * * * *